United States Patent
Tsunoda et al.

(10) Patent No.: US 10,217,143 B2
(45) Date of Patent: Feb. 26, 2019

(54) INFORMATION PROCESSING SYSTEM, INFORMATION PROCESSING METHOD, AND INFORMATION PROCESSING PROGRAM

(71) Applicant: Rakuten, Inc., Tokyo (JP)

(72) Inventors: Takaaki Tsunoda, Tokyo (JP); Zofia Stankiewicz, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 303 days.

(21) Appl. No.: 14/906,409

(22) PCT Filed: Nov. 11, 2014

(86) PCT No.: PCT/JP2014/079883
§ 371 (c)(1),
(2) Date: Jan. 20, 2016

(87) PCT Pub. No.: WO2015/133009
PCT Pub. Date: Sep. 11, 2015

(65) Prior Publication Data
US 2016/0162958 A1 Jun. 9, 2016

Related U.S. Application Data

(60) Provisional application No. 61/948,253, filed on Mar. 5, 2014.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0282* (2013.01); *G06Q 30/0601* (2013.01)

(58) Field of Classification Search
CPC .................. G06Q 30/0282; G06Q 30/0601
USPC ...................................... 705/26, 28
See application file for complete search history.

(56) References Cited

U.S. PATENT DOCUMENTS

| | | | | |
|---|---|---|---|---|
| 7,472,074 | B1 * | 12/2008 | Walker | G06Q 10/02 705/26.82 |
| 2009/0265332 | A1 * | 10/2009 | Mushtaq | G06F 17/30 |
| 2011/0225203 | A1 * | 9/2011 | Hart-Davidson | G06Q 10/10 707/792 |

FOREIGN PATENT DOCUMENTS

JP 2010146288 A 7/2010

* cited by examiner

*Primary Examiner* — Rokib Masud
(74) *Attorney, Agent, or Firm* — Sughrue Mion, PLLC (57) ABSTRACT

An information processing system according to one embodiment includes a first specifying unit, a second specifying unit, a generation unit, and an output unit. The first specifying unit specifies one or more first evaluation points of view corresponding to an expression in first information created by a provider of an object based on dictionary data indicating association between an expression and an evaluation point of view. The second specifying unit specifies one or more second evaluation points of view corresponding to the expression in second information created by a reviewer for the object based on the dictionary data. The generation unit generates supplementary information based on a difference in an evaluation degree between the first evaluation point of view and the second evaluation point of view. The output unit outputs the supplementary information.

10 Claims, 8 Drawing Sheets

| FACILITY ID | DESCRIPTION |
|---|---|
| H0001 | We offer warm, attentive service. You can enjoy wonderful sunset from our ocean-view rooms. |
| H0002 | Private small inn for adults. You can enjoy dinner in your room. |
| H0003 | Five-minute walk from train station. High-speed wireless LAN available. |
| ... | ... |

| USER ID | FACILITY ID | REVIEW |
|---|---|---|
| U2001 | H0001 | The location is very convenient, just five minutes by taxi from the train station. |
| U2001 | H0003 | It's close to an outlet and very convenient for shopping. |
| U2005 | H0001 | Pick-up service helped us a lot. We also loved the food. |
| ... | ... | ... |

| EVALUATION POINT OF VIEW | EXPRESSION |
|---|---|
| SERVICE | "SERVICE","HOSPITALITY","PICK-UP", .... |
| LOCATION | "WALK","STATION","OUTLET", .... |
| LANDSCAPE | "VIEW","PANORAMA","OCEAN", .... |
| ⋮ | ⋮ |

INFORMATION PROCESSING SYSTEM, INFORMATION PROCESSING METHOD, AND INFORMATION PROCESSING PROGRAM

CROSS REFERENCE TO RELATED APPLICATIONS

This application is a National Stage of International Application No. PCT/JP2014/079883, filed on Nov. 11, 2014, which claims priority from U.S. Patent Provisional Application No. 61/948,253, filed on Mar. 5, 2014, the contents of all of which are incorporated herein by reference in their entirety.

TECHNICAL FIELD

One aspect of the present invention relates to an information processing system, an information processing method, and an information processing program for processing a plurality of pieces of text written by a plurality of creators.

BACKGROUND ART

It is common to tell the appeal of a certain object to others by written text. For example, on an electronic commerce site (EC site), sellers place descriptions of products on their web pages to attract attention of users who are potential purchasers. For example, according to Patent Literature 1 below, a product image, name and description are shown on a web page. A user can determine whether or not to purchase the product by reference to the text.

CITATION LIST

Patent Literature

Patent Literature 1: JP 2010-146288 A

SUMMARY OF INVENTION

Technical Problem

However, a person who provides information to promote a certain object to others does not necessarily know all about that object. It is thus desirable to extract a difference between the characteristics of an object considered by an information provider and the characteristics of that object considered by users.

Solution to Problem

An information processing system according to one aspect of the present invention includes a first specifying unit configured to specify, based on dictionary data indicating association between an expression and an evaluation point of view, one or more first evaluation points of view corresponding to the expression in first information created by a provider of an object; a second specifying unit configured to specify, based on the dictionary data, one or more second evaluation points of view corresponding to the expression in second information created by a reviewer for the object; a generation unit configured to generate supplementary information based on a difference in an evaluation degree between the first evaluation point of view and the second evaluation point of view; and an output unit configured to output the supplementary information.

An information processing method according to one aspect of the present invention is an information processing method performed by an information processing system with a processor, the method including a first specifying step of specifying, based on dictionary data indicating association between an expression and an evaluation point of view, one or more first evaluation points of view corresponding to the expression in first information created by a provider of an object; a second specifying step of specifying, based on the dictionary data, one or more second evaluation points of view corresponding to the expression in second information created by a reviewer for the object; a generation step of generating supplementary information based on a difference in an evaluation degree between the first evaluation point of view and the second evaluation point of view; and an output step of outputting the supplementary information.

An information processing program according to one aspect of the present invention causes a computer to function as a first specifying unit configured to specify, based on dictionary data indicating association between an expression and an evaluation point of view, one or more first evaluation points of view corresponding to the expression in first information created by a provider of an object; a second specifying unit configured to specify, based on the dictionary data, one or more second evaluation points of view corresponding to the expression in second information created by a reviewer for the object; a generation unit configured to generate supplementary information based on a difference in an evaluation degree between the first evaluation point of view and the second evaluation point of view; and an output unit configured to output the supplementary information.

In the above aspects, evaluation points of view are specified for first and second information respectively written by a provider and a reviewer for the same object, and supplementary information is generated and output based on a difference in the evaluation degree between the respective evaluation points of view. It is thereby possible to extract a difference between the characteristics of an object considered by an information provider and the characteristics of that object considered by users.

Advantageous Effects of Invention

According to one aspect of the present invention, it is possible to extract a difference between the characteristics of an object considered by an information provider and the characteristics of that object considered by users.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted. The functions and configuration of an information processing system 10 according to an embodiment are described hereinafter with reference to FIGS. 1 to 6. The information processing system 10 is a computer system that compares first information created for a certain object by a first creator with second information created for the same object by a second creator and outputs supplementary information.

The type of the "object" in this specification is not particularly limited, and it may be an actual thing or a virtual thing. Further, the object may be a tangible object or a non-tangible object. The "creator" in this specification is a user who publishes created text on a computer network. The first creator and the second creator are different. The type of the computer network is not particularly limited, and it may be the Internet or an intranet, for example.

Each of the first information and the second information in this specification is represented by using at least one of text and an image. The "text" in this specification is a sentence or sentences. The "image" in this specification is an image where an object is fixed on a medium so that it is perceivable by the human sense of sight. The image is stored in a storage device such as a memory and output to an output device such as a monitor or a printer by processing of a processor and thereby becomes visible. The image may be a still image or a moving image. Examples of the still image include a photograph, a picture, a design (including an image representing a figure such as a star or a circle) and the like, and examples of the moving image include a video image, an animation and the like, though the type of the image is not limited thereto. The image may be obtained by electronic equipment such as a camera or a scanner, or may be created by computer graphics. In this embodiment, an information processing system 10 is described based on the assumption that the first and second information is text (i.e. first text and second text).

The first and second creators may be any persons, and persons in various positions can be the first and second creators. In addition, the content of text and the object represented by text are also not particularly limited. For example, the first creator may be a provider of a product on an online shopping site, and the second creator may be a general user who has purchased a product on that site. In this case, the first text is a description of a product, and the second text is a comment (product review) on that product, for example, and therefore the object in this case is a product. Further, the general user is a reviewer. The "product" is any tangible or non-tangible object that can be traded with or without charge. The tangible object is not particularly limited, and it may be a movable property or an immovable property. Further, the non-tangible object is also not particularly limited, and it may be provision of any service, for example.

A place in which the second text is published is also not limited. For example, a posted review may be published by the review feature that is provided by the EC site or may be published by the feature of a page that is created by an administrator who is not related to a seller (which is a page of a site different from the EC site). Examples of the latter include the review feature that is provided by another site sharing the evaluations of products, the feature of a bulletin board system (BBS) or a microblog by an administrator who is not related to a seller, the feature of an individual web site (so-called blog site) and the like. Note that, however, in order to acquire the second text that is published by the feature of a page created by an administrator who is not related to a seller, it is necessary that the first text and the second text are associated with each other in advance by an arbitrary way. For example, it is necessary that a page on which a description of a product is shown and a review which is posted on a BBS are associated in advance.

A product review is one type of a posted review. The "posted review" in this specification is text that is created by a creator and is published to a group including users other than the creator. The way the group is organized is not limited, and it may be a group which anyone can participate in (so-called an open group) or a group which only specific persons can participate in (so-called a closed group). For example, a group in which anyone can post or view text on a certain website on the Internet is the open group. For another example, a group in which a person cannot post or view text on a certain website on the Internet unless taking a procedure such as logging in is the closed group. The contents of a posted review are not limited. For example, one posted review may contain a matter about an object and a matter about something different from the object.

The "supplementary information" in this specification is information for complementing a difference between the first information and the second information. The "difference between the first information and the second information" is information that is indicated (or sufficiently indicated) by one of the first and second information but not indicated (or not sufficiently indicated) by the other of the first and second information. To "supplement" means providing information for complementing the difference. Thus, the supplementary information serves to complement information about an object.

Figure 1:
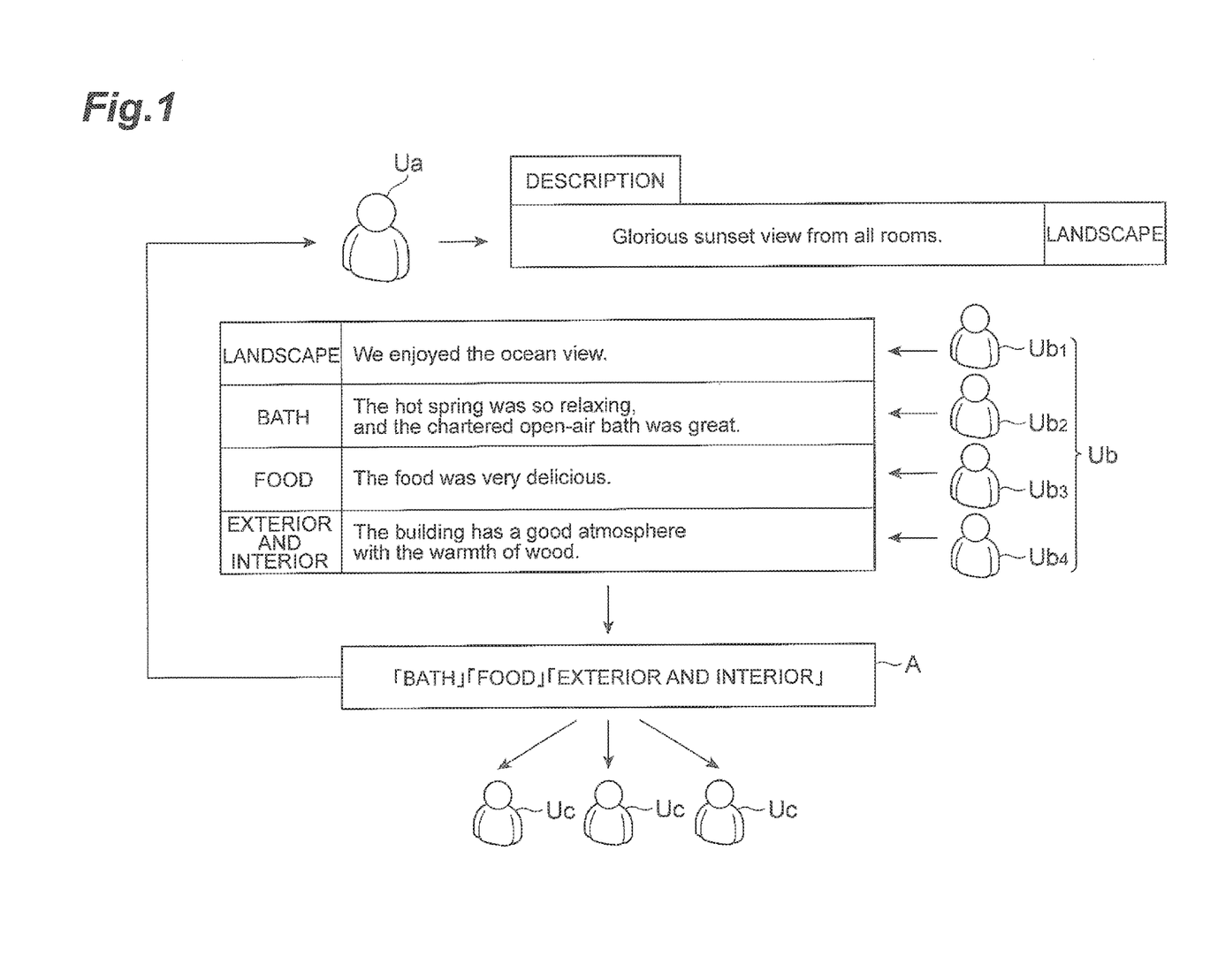
FIG. 1 is a conceptual view of processing in an information processing system according to an embodiment.

FIG. 1 shows the concept of processing in the information processing system 10 according to this embodiment in a simplified manner. In this example, it is assumed that the first creator is a provider Ua, which is a person who provides a product on an accommodation reservation site, the first text is a product description, the second creator is a user (a general public who uses the accommodation reservation site) Ub who has purchased the product on that site, and the second text is a product review. Further, in this example, it is assumed that the product is a hotel (to be more specific, a right to use a hotel).

Now it is assumed that the provider Ua has created the description "Glorious sunset view from all rooms" and put it on the accommodation reservation site. Further, four users Ub (to be specific, users $Ub_1$, $Ub_2$, $Ub_3$ and $Ub_4$) who have made reservations for a hotel through the accommodation reservation site and actually stayed at the hotel have posted comments on the hotel as product reviews on the accommodation reservation site.

In this case, the information processing system 10 specifies evaluation points of view from the description and further specifies evaluation points of view from each product review. The "evaluation point of view" in this specification indicates an attribute or a part of an object which serves as a reference for evaluating the object. The attribute or part that is selected as the evaluation point of view of a certain object is not particularly limited. In the example of FIG. 1, the object is a hotel, and in this case, various attributes of a hotel such as landscape, access and food can be set as the evaluation points of view.

Although a specific way to specify the evaluation points of view from text is described later, in the example of FIG. 1, the information processing system 10 specifies the evaluation point of view "landscape" from the above-described description. Further, the information processing system 10 specifies the evaluation points of view "landscape", "bath", "food" and "exterior and interior" from the product reviews by the users $Ub_1$, $Ub_2$, $Ub_3$ and $Ub_4$, respectively.

Next, the information processing system 10 compares the evaluation point of view obtained from the description with the evaluation points of view obtained from the plurality of posted reviews and extracts supplementary information for supplementing the description from the product reviews. In this example, the evaluation point of view of the description coincides with the evaluation point of view of the product review by the user $Ub_1$ and is different from the evaluation points of view of the product reviews by the users $Ub_2$, $Ub_3$ and $Ub_4$. Thus, the information processing system 10 generates the supplementary information indicating the three evaluation points of view "bath", "food" and "exterior and interior", which are not indicated by the description.

In this manner, the information processing system 10 generates the supplementary information based on a difference between a first evaluation point of view (for example, an evaluation point of view specified from a description) and a second evaluation point of view (for example, an evaluation point of view specified from a product review). To be more specific, the information processing system 10 generates the supplementary information based on a difference in the evaluation degree between the first evaluation point of view and the second evaluation point of view. The evaluation degree is the strength of expression by a creator (for example, an object provider, a reviewer etc.) about a certain evaluation point of view of an object. The evaluation degree is, in other words, the degree of expression.

Although FIG. 1 shows that those three evaluation points of view form the supplementary information A, the way the supplementary information A is represented is not particularly limited. For example, the supplementary information A may be a part or the whole of the product reviews by the users $Ub_2$, $Ub_3$ and $Ub_4$, and it may be a combination of a part or the whole of the product reviews and the evaluation point of view. Specifically, the information processing system 10 may set the whole of the product review by the user $Ub_2$ "The hot spring was so relaxing, and the chartered open-air bath was great" or only a part "the chartered open-air bath was great" of that product review, or a combination {"The hot spring was so relaxing, and the chartered open-air bath was great", "bath"} as the supplementary information.

The information processing system 10 outputs the generated supplementary information. The supplementary information can be referred to by an arbitrary person. For example, as shown in FIG. 1, the supplementary information may be provided to the provider Ua who has created the description of the product or may be provided to the users Uc who access the accommodation reservation site. Note that the users Uc may include the user Ub who has posted the product review. In the case where the supplementary information is provided to the provider Ua, the provider Ua can obtain from the supplementary information the feature of their own product which they have not been aware of, and can modify the description of the product to indicate that feature. Further, the users Uc can select the product by referring to the supplementary information in addition to the description or by referring to the modified description.

The information processing system 10 includes one or more computers and, when it includes a plurality of computers, the functional elements of the information processing system 10, which are described later, are implemented by distribution processing. The variety of each of the computers is not particularly limited. For example, a stationary or portable personal computer (PC) may be used, a workstation may be used, or a mobile terminal such as an advanced mobile phone (smart phone), a cellular phone or a personal digital assistant (PDA) may be used. Alternatively, the information processing system 10 may be constructed by combining various types of computers. When using a plurality of computers, those computers are connected through a communication network such as the Internet or an intranet.

Figure 2:
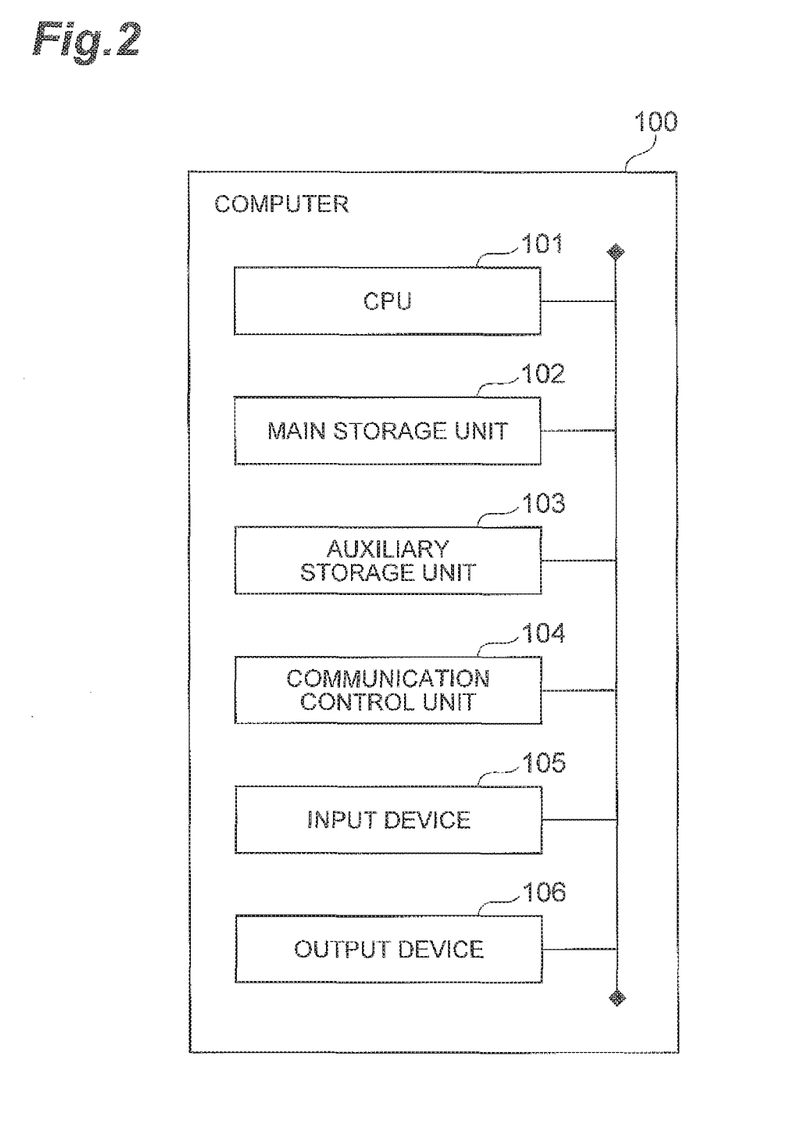
FIG. 2 is a view showing a hardware configuration of a computer to implement an information processing system according to an embodiment.

FIG. 1 shows a typical hardware configuration of each computer 100 in the information processing system 10. The computer 100 includes a CPU (processor) 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display or a printer. As a matter of course, hardware modules mounted thereon vary by the type of the computer 100. For example, while a stationary PC and a workstation often include a keyboard, a mouse and a monitor as the input device and the output device, a smartphone often has a touch panel that functions as the input device and the output device.

The functional elements of the information processing system 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

For easier understanding, it is assumed in the following description that the first text is a description of a facility that is written by a provider of a product on a facility reservation site, and the second text is a review that is posted by a user (purchaser) who has made reservations and used a facility in the facility reservation site. Accordingly, an object is a facility. Further, the user is a reviewer. The "facility" in this specification is an outdoor or indoor place available to general public. Examples of the facility include an accommodation (hotel, inn etc.), a golf course, a concert hall and the like, though the type of the facility is not limited thereto. Prior to describing the functional elements of the information processing system 10, storage units (see FIG. 6) which the information processing system 10 refers to are described hereinbelow.

A first text database 21 is a database (storage device or storage unit) that stores the first text that is written about an object by the first creator. In this embodiment, the first text database 21 stores a description written by a product provider. A specific way of implementing the first text database 21 is not limited, and the first text database 21 may be prepared as a relational database or a text file, for example. Further, the place where the first text database 21 is placed is not limited, and the first text database 21 may be located inside the information processing system 10 or located in another computer system which is different from the information processing system 10. In the case where the first text database 21 is located in another information processing system, the information processing system 10 can access the first text database 21 through a communication network.

The first text database 21 stores the first text data in which an identifier that uniquely identifies an object and text are associated with each other. Note that a specific way to associate an object and text is not limited. For example, an object and text may be associated directly in one record, or a record containing an identifier of an object and another record containing text may be associated indirectly through another item. Further, the first text data may contain an item other than an identifier of an object and text.

Figure 3:
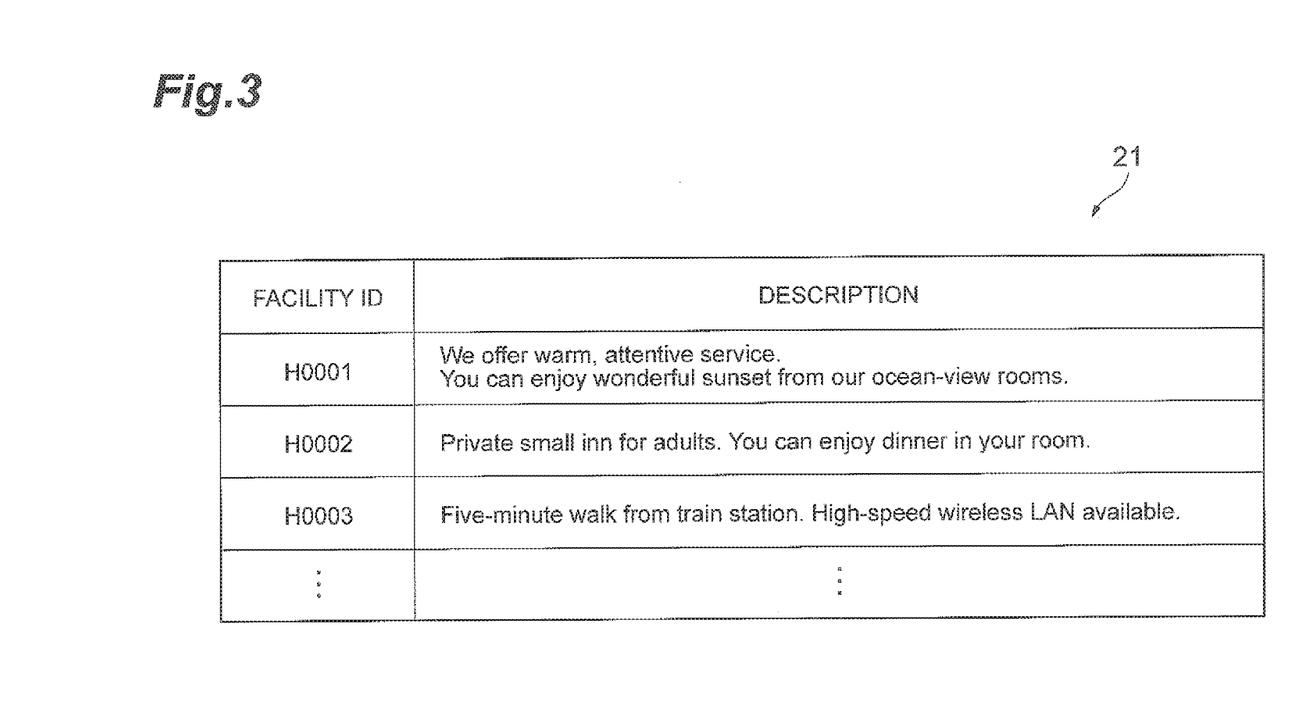
FIG. 3 is a view showing an example of first text data (description data)

In this embodiment, the first text database 21 stores description data in which a facility ID that uniquely identifies a facility and a description of this facility are associated as the first text data. FIG. 3 shows an example of the description data. In general, the facility information contains, in addition to a facility ID, a facility name, address, telephone number, list of accommodation plans and the like, and a description is contained in the facility information in some cases. Thus, such facility information can be used as the first text data. However, FIG. 3 shows only the facility ID and the description that are necessary for the explanation. It is seen from FIG. 3 that the description of the facility which is identified by "H0001" is "We offer warm, attentive service. You can enjoy wonderful sunset from our ocean-view rooms", for example.

This embodiment is based on the assumption that a facility and a creator of a description of the facility (which is a product provider) are in one-to-one correspondence. Note that, however, the correspondence between the first creator and the first text may be one to many, and in this case, the first text data is data in which an identifier that uniquely specifies a creator, an identifier that uniquely identifies an object, and text are associated with one another.

A second text database 22 is a database (storage device or storage unit) that stores the second text that is written about an object by the second creator. In this embodiment, the second text database 22 stores a product review that is written by a user (purchaser). A specific way of implementing the second text database 22 is also not limited, and the second text database 22 may be prepared as a relational database or a text file, for example. Further, the place where the second text database 22 is placed is not limited, and the second text database 22 may be located inside the information processing system 10 or located in another computer system which is different from the information processing system 10. In the case where the second text database 22 is located in another information processing system, the information processing system 10 can access the second text database 22 through a communication network.

The second text database 22 stores the second text data in which an identifier that uniquely identifies a creator, an identifier that uniquely identifies an object, and text are associated with one another. Note that a specific way to associate a creator, an object and text is not limited. For example, a creator, an object and text may be associated directly in one record, or some of those items and the rest may be associated indirectly through another item. Further, the second text data may contain an item other than those three items.

Figure 4:
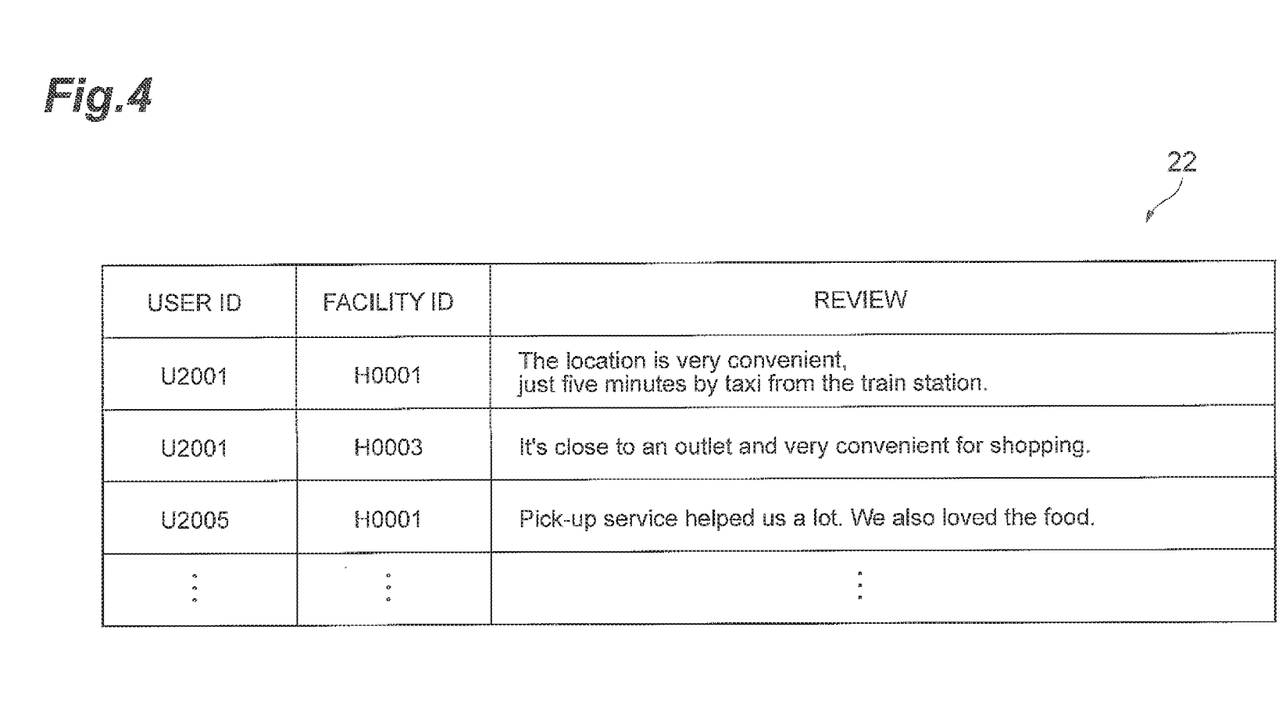
FIG. 4 is a view showing an example of second text data (review data).

In this embodiment, the second text database 22 stores review data in which a user ID that uniquely identifies a user (purchaser), a facility ID, and a product review (which is hereinafter also referred to simply as "review") are associated as the second text data. FIG. 4 shows an example of the review data. Although there is a case where information indicating a review contains other items as described above, FIG. 4 shows only the user ID, the facility ID and the review that are necessary for the explanation. It is seen from FIG. 4 that the user who is identified by "U2001" has posted the review "The location is very convenient, just five minutes by taxi from the train station" on the facility which is identified by "H0001".

One second creator writes about each of a plurality of objects in some cases, and a plurality of different second creators write about one object in other cases. Accordingly, the second creator and an object are in many-to-many correspondence.

An evaluation view point dictionary 23 is a database (storage device) that stores dictionary data indicating correspondence between evaluation points of view and expressions. In this embodiment, attributes related to facilities are set as the evaluation points of view, and expressions related to facilities are also set. The dictionary data is preset by an administrator of the information processing system 10. The number of evaluation points of view to be set is not limited as long as it is two or more, and it may be 10, 20, or 100, for example.

One or a plurality of expressions are associated with one evaluation point of view. The "expression" in this specification is a combination of one or more words, and therefore a certain expression may be composed of one word, or two or more words. Any word or phrase may be set as an expression, and a part of speech of them is also not limited. For example, an expression representing the characteristic of an object is selected and stored in the evaluation view point dictionary 23. Generally, parts of speech of words representing the characteristic of an object are noun (general noun or proper noun), adjective, adverb, verb and the like. Note that, in consideration of notational variants or inflection of each word, a plurality of syllabaries may be stored for one expression (one word or phrase) in the evaluation view point dictionary 23.

Figure 5:
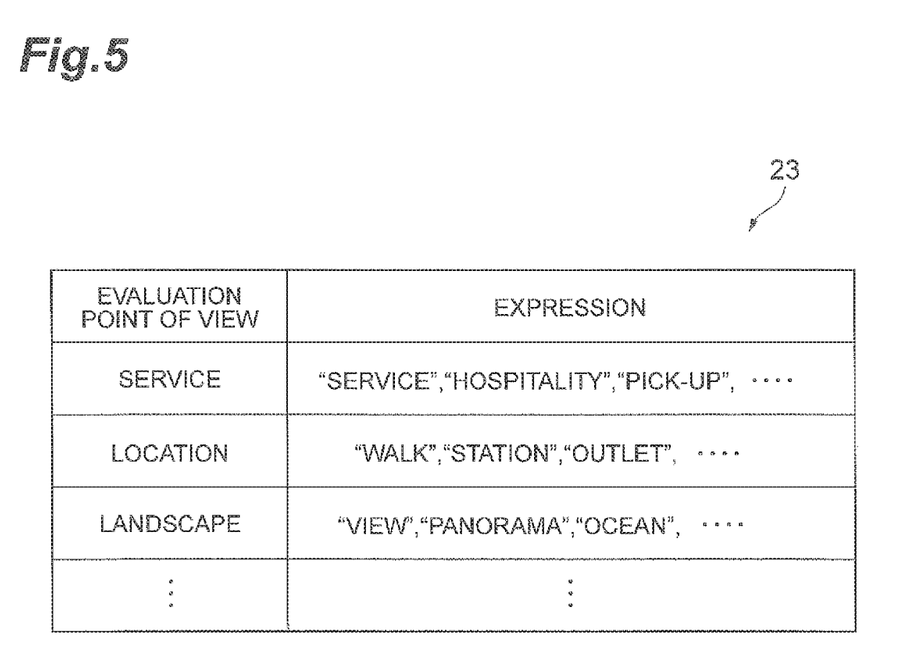
FIG. 5 is a view showing an example of dictionary data.

FIG. 5 shows an example of the dictionary data. Although the dictionary data may contain items other than the evaluation point of view and the expression, FIG. 5 shows only the evaluation points of view and the expressions that are necessary for the explanation. It is seen from FIG. 5 that the expressions such as "service", "hospitality" and "pick-up" correspond to the evaluation point of view "service". Note that there is a case where the word that identifies an evaluation point of view is used also as an expression corresponding to that evaluation point of view, like "service" in the example of FIG. 5.

The dictionary data may be generated so that only one expression is associated with one evaluation point of view, and in this case, the expression itself is set as the evaluation point of view. However, in this case, similar evaluation points of view are differentiated, which can cause an increase in the processing load of the information processing system 10 or an excessive amount of supplementary information. As one example, all of three expressions "access", "convenience of location" and "station" are descriptions about the location of a facility, and it is more convenient to take them together. Therefore, in this embodiment, it is assumed that a plurality of expressions related to one another are grouped into one evaluation point of view.

The information processing system 10 refers to the first text data already stored in the first text database 21, the second text data already stored in the second text database 22, and the dictionary data already stored in the evaluation view point dictionary 23. Thus, the information processing system 10 does not need to consider how each data has been stored in each database.

Figure 6:
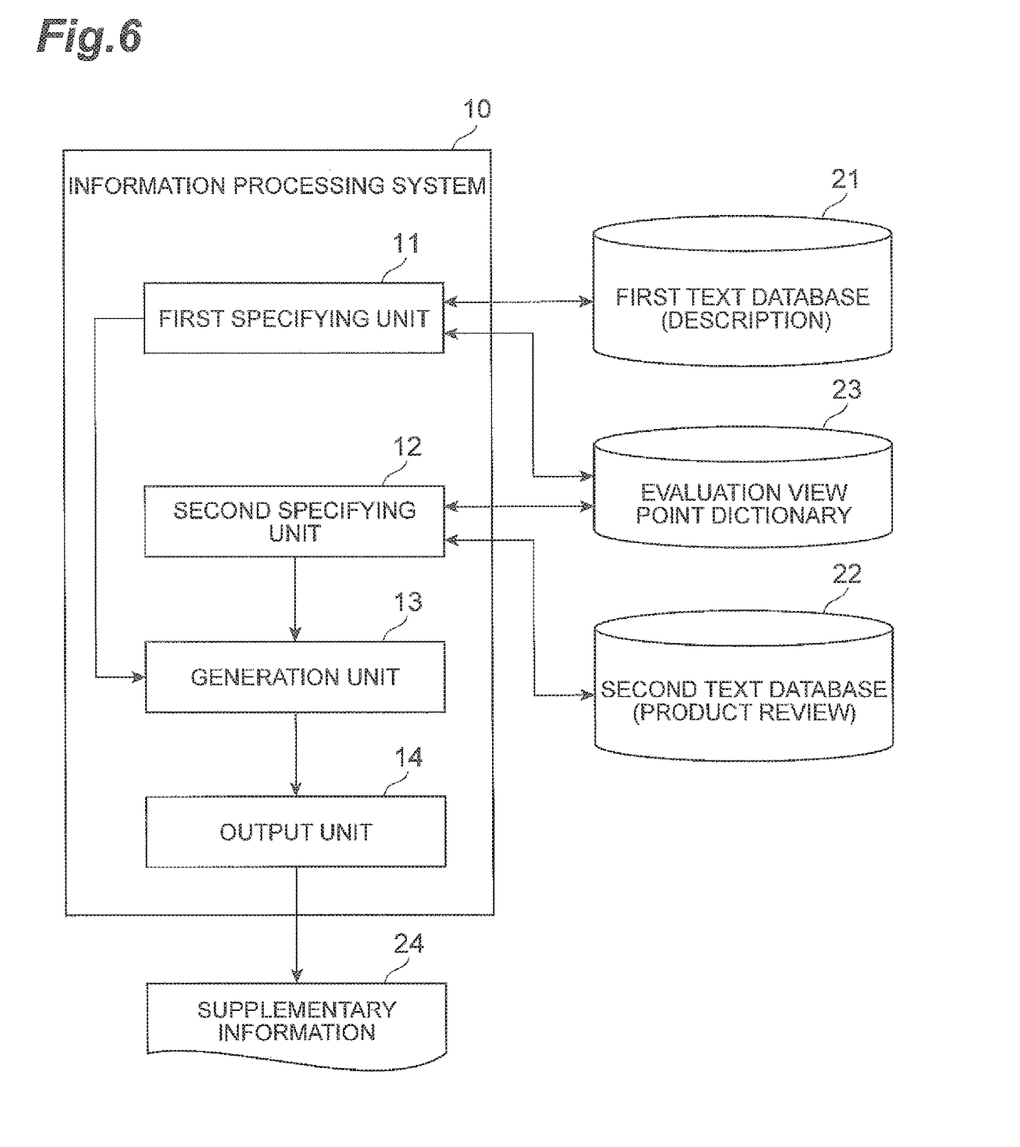
FIG. 6 is a block diagram showing a functional configuration of an information processing system according to an embodiment.

As shown in FIG. 6, the information processing system 10 includes, as functional elements, a first specifying unit 11, a second specifying unit 12, a generation unit 13, and an output unit 14.

The first specifying unit 11 is a functional element that specifies a first evaluation point of view corresponding to an expression in the first text. The first specifying unit 11 performs the following processing on each of one or more facilities (objects) that are designated by an administrator of the information processing system 10 or designated automatically by an arbitrary rule.

The first specifying unit 11 reads the description of a facility from the first text database 21. Next, the first specifying unit 11 divides the description into a plurality of expressions by using a known technique such as morphological analysis or semantic analysis. Then, the first specifying unit 11 compares each expression obtained by the division with the dictionary data in the evaluation view point dictionary 23 and thereby specifies the evaluation point of view corresponding to the expression. Because the number of expressions to be compared can be more than one, the first specifying unit 11 specifies one or a plurality of evaluation points of view in some cases. In other cases, the first specifying unit 11 does not specify any evaluation point of view from one description. The first specifying unit 11 generates first specifying data in which the facility ID, the description, and the specified evaluation point of view are associated with one another. When no evaluation point of view is specified, the first specifying unit 11 may generate the first specifying data in which the facility ID, the description, and null are associated with one another.

It is assumed that the first specifying unit 11 processes the description "We offer warm, attentive service. You can enjoy wonderful sunset from our ocean-view rooms" which corresponds to the facility ID "H0001" shown in FIG. 3. It is also assumed that the evaluation view point dictionary 23 stores the dictionary data associating the evaluation point of view "service" and the expression "service", and the dictionary data associating the evaluation point of view "landscape" and the expressions "view" and "sunset". In this case, based on those dictionary data, the first specifying unit 11 specifies the two evaluation points of view "service" and "landscape" from the description. When the same evaluation point of view, such as "landscape" in this example, is specified from a plurality of expressions, the first specifying unit 11 does take the number of evaluation points of view into consideration.

After the first specifying unit 11 specifies the evaluation points of view for all of the facilities to be processed, it outputs the first specifying data for each of the facilities to the generation unit 13.

The second specifying unit 12 is a functional element that specifies a second evaluation point of view corresponding to an expression in the second text. The second specifying unit 12 performs the following processing on each of one or more facilities (objects), which are the same as those processed by the first specifying unit 11.

The second specifying unit 12 reads one or more reviews (review group) corresponding to the facility from the second text database 22. Next, the second specifying unit 12 performs the following processing on each of the read reviews.

The second specifying unit 12 divides the review into a plurality of expressions by using a known technique such as morphological analysis or semantic analysis. Then, the second specifying unit 12 compares each expression obtained by the division with the dictionary data in the evaluation view point dictionary 23 and thereby specifies the evaluation point of view corresponding to the expression. Because the number of expressions to be compared can be more than one, the second specifying unit 12 specifies one or a plurality of evaluation points of view in some cases. In other cases, the second specifying unit 12 does not specify any evaluation point of view from one description. When one or more evaluation points of view are specified, the second specifying unit 12 generates second specifying data in which the facility ID, the review, and the specified evaluation point of view are associated with one another. When no evaluation point of view is specified, the second specifying unit 12 may generate the second specifying data in which the facility ID, the review, and null are associated with one another.

It is assumed that the second specifying unit 12 processes the facility ID "H0001" shown in FIG. 4. In this case, the second specifying unit 12 reads the review "The location is very convenient, just five minutes by taxi from the train station" by the user ID "U2001" and the review "Pick-up service helped us a lot. We also loved the food." by the user ID "U2005" from the second text database 22. It is also assumed that the evaluation view point dictionary 23 stores the dictionary data associating the evaluation point of view "location" and the expressions "station" and "taxi", the dictionary data associating the evaluation point of view "service" and the expressions "pick-up" and "service", and the dictionary data associating the evaluation point of view "food" and the expression "food".

In this case, based on those dictionary data, the second specifying unit 12 specifies two evaluation points of view "location" and "location" from the review by the user ID "U2001". Specifically, when the same evaluation point of view is specified from a plurality of expressions as in this example, the second specifying unit 12 specifies the evaluation points of view by taking the number of evaluation points of view into consideration. Likewise, the second specifying unit 12 specifies three evaluation points of view "service", "service" and "food" from the review by the user ID "U2005". Finally, the second specifying unit 12 generates the second specifying data in which the facility ID "H0001", the review by "U2001", and the two evaluation points of view "location" and "location" are associated with one another, and the second specifying data in which the facility ID "H0001", the review by "U2005", and the three evaluation points of view "service", "service" and "food" are associated with one another.

After the second specifying unit 12 specifies the evaluation points of view for all of the facilities to be processed, it outputs the second specifying data for each of the facilities to the generation unit 13.

The generation unit 13 is a functional element that generates supplementary information based on a difference between the first evaluation point of view and the second evaluation point of view. The generation unit 13 performs the following processing on each of one or more facilities (objects) based on the first specifying data (evaluation points of view obtained from a description) and the second specifying data (evaluation points of view obtained from a review group).

First, the generation unit 13 specifies a type of an evaluation point of view g from each of the first specifying data and the second specifying data on one facility h to be processed, and then extracts the evaluation point of view g contained only in the second specifying data. This processing means extracting the evaluation point of view that is not indicated by the description but is indicated by the review group. This extraction technique corresponds to the processing of extracting the evaluation point of view where a difference in the evaluation degree between the first and second specifying data is 1 when the evaluation degree of the evaluation point of view contained in the specifying data is 1, and the evaluation degree of the evaluation point of view not contained in the specifying data is 0. For example, when the evaluation points of view ga and gb are contained in the first specifying data (description) and the evaluation points of view gb, gc, gd and ge are contained in the second specifying data (review group) for a certain facility h, the generation unit 13 extracts the evaluation points of view gc, gd and ge.

Then, the generation unit 13 counts the frequency of appearance f(h,g) of the evaluation point of view g for each of the extracted evaluation points of view g. The frequency of appearance may be counted on an expression-by-expression basis (for example, on a word-by-word basis), on a sentence-by-sentence basis, or on a review-by-review basis.

In the case of counting the frequency of appearance on an expression-by-expression basis, the generation unit 13 increases the frequency of appearance of the evaluation point of view g in increments of 1 each time an expression corresponding to the evaluation point of view g appears. For example, in the example of two reviews on the facility ID "H0001" described above, the frequency of appearance of the evaluation points of view "location", "service" and "food" is 2, 2 and 1, respectively.

In the case of counting the frequency of appearance on a sentence-by-sentence basis, the generation unit 13 sets the number of sentences containing an expression corresponding to the evaluation point of view g as the frequency of appearance of the evaluation point of view g. For example, in the example of two reviews on the facility ID "H0001" described above, the frequency of appearance of the evaluation points of view "location", "service" and "food" is 1, 1 and 1, respectively.

In the case of counting the frequency of appearance on a review-by-review basis, the generation unit 13 sets the number of reviews containing an expression corresponding to the evaluation point of view g as the frequency of appearance of the evaluation point of view g. For example, in the example of two reviews on the facility ID "H0001" described above, the frequency of appearance of the evaluation points of view "location", "service" and "food" is 1, 1 and 1, respectively.

The above-described ways to calculate the frequency of appearance are compared using another abstract example. For example, it is assumed that there are two reviews R1 and R2 on a certain facility h. The review R1 is composed of two sentences R1a and R1b, and the review R2 is composed of two sentences R2a and R2b. It is also assumed that the following evaluation points of view are specified from each sentence.

Sentence R1a (Review R1): Evaluation points of view gp, gq
Sentence R1b (Review R1): Evaluation points of view gp
Sentence R2a (Review R2): Evaluation points of view gq, gq, gq gr, gr
Sentence R2b (Review R2): Evaluation points of view gr, gq The frequency of appearance of the evaluation points of view gp, gq and gr in this example is 2, 5 and 3 when counted on an expression-by-expression basis, 2, 3 and 2 when counted on a sentence-by-sentence basis, and 1, 2 and 1 when counted on a review-by-review basis, respectively.

When the frequency of appearance is counted on an expression-by-expression basis (for example, on a word-by-word basis), there is a possibility that a certain evaluation point of view appears in rather many counts due to the fact that a certain review (second text) contains long sentences or the like, which can cause a deviation in the frequency of appearance. The occurrence of such a deviation can be suppressed by counting the frequency of appearance on a sentence-by-sentence basis or on a review-by-review basis.

After obtaining the frequency of appearance f(h,g) of each evaluation point of view g, the generation unit 13 calculates a score S(h,g) of the evaluation point of view g in the facility h based on the frequency of appearance f(h,g). This score S(h,g) is an index indicating how characteristic the evaluation point of view g is in the facility h. In other words, the score S(h,g) indicates the characteristic degree of the evaluation point of view g in the facility h. The evaluation point of view g where the score S(h,g) is high in the facility h is an element that heightens the profile of the facility h when compared with other facilities. There are various ways to calculate the score.

For example, the generation unit 13 may set the frequency of appearance f(h,g) as the score S(h,g).

Alternatively, the generation unit 13 may calculate the score S(h,g) by using a log-likelihood ratio (LLR). LLR(h,g) in this embodiment is a log ratio of a probability Pd(h,g) that the evaluation point of view g appears dependently on the facility h to a probability Pi(h,g) that the evaluation point of view g appears independently of the facility h. Accordingly, LLR(h,g)=log(Pd(h,g)/Pi(h,g)). Note that "log" represents logarithmic function.

A specific calculation example of LLR is described hereinbelow. In this example, variables a, b, c, d and n that are defined by the following equations are used.

$$a = f(h, g)$$

$$b = \sum_{h' \neq h} f(h', g)$$

$$c = \sum_{g'} f(h, g') - a$$

$$d = \sum_{h' \neq h} \sum_{g'} f(h', g') - b$$

$$n = a + b + c + d$$

The meanings of the variables a, b, c and d are as follows.
a: The frequency of appearance of the evaluation point of view g in a review group of the facility h
b: The frequency of appearance of the evaluation point of view g in a review group of another facility h' different from the facility h
c: (The frequency of appearance of all evaluation points of view (g') in a review group of the facility h)-a
d: (The frequency of appearance of all evaluation points of view (g') in a review group of another facility h')-b Using those variables, the generation unit 13 calculates the log-likelihood ratio $LLR_0(h,g)$ by the following equation.

$$LLR_0(h, g) = a\log\frac{an}{(a+b)(a+c)} + b\log\frac{bn}{(a+b)(b+d)} + c\log\frac{cn}{(c+d)(a+c)} + d\log\frac{dn}{(c+d)(b+d)}$$

Note that, however, the value of $LLR_0(h,g)$ becomes high for both of the evaluation point of view that "appears characteristically in a review group of the facility h to be processed and hardly appears in a review group of another facility h'" and the evaluation point of view that "appears characteristically in a review group of another facility h' and hardly appears in a review group of the facility h to be processed". Thus, the generation unit 13 makes corrections so that only the evaluation point of view that "appears characteristically in a review group of the facility h to be processed and hardly appears in a review group of another facility h'" has a high value. Specifically, the generation unit 13 sets $S(h,g)=+LLR_0(h,g)$ when ad−bc>0, and otherwise sets $S(h,g)=-LLR_0(h,g)$.

Note that the way to calculate the score S(hg) is not limited thereto. For example, the generation unit 13 may calculate the score S(h,g) by using another measure different from the log-likelihood ratio.

Then, the generation unit 13 generates supplementary information 24 based on the extracted evaluation points of view. As one example, the generation unit 13 may generate the supplementary information 24 indicating all of the evaluation points of view obtained from differences between the first specifying data and the second specifying data regardless of the score S(h,g). In this case, the generation unit 13 can omit the calculation of the score S(h,g). Alternatively, the generation unit 13 may sort the obtained evaluation points of view in descending order of the score S(h,g) and then generate the supplementary information 24 indicating some or all of the evaluation points of view. For example, the generation unit 13 may generate the supplementary information 24 indicating only the top n number of evaluation points of view with high scores (which is the technique so-called N-best. In this case, the value n is a threshold), or generate the supplementary information 24 indicating only the evaluation points of view where the score is equal to or higher than a specified threshold.

The content of the supplementary information 24 may be set arbitrarily. For example, the generation unit 13 may set the selected evaluation point of view as the supplementary information 24, and in this case, the generation unit 13 may set a pair of the evaluation point of view and its score as the supplementary information 24. Alternatively, the generation unit 13 may set the sentence or review from which the evaluation point of view is extracted as the supplementary information 24, or set the expression corresponding to the evaluation point of view as the supplementary information 24. Alternatively, the generation unit 13 may newly generate the supplementary information 24 based on those evaluation point of view, sentence or review.

Alternatively, the generation unit 13 may generate a message indicating that the first evaluation point of view indicated by a product provider is not contained in product reviews as the supplementary information 24. Alternatively, the generation unit 13 may generate the supplementary information 24 containing that message and the selected evaluation point of view. Such supplementary information is shown to a product provider.

There many ways to generate the supplementary information as described above. In any case, the generation unit 13 generates the supplementary information where the evaluation point of view specified from the second text is expressed. This is, in other words, the processing that the generation unit 13 generates the supplementary information by using the second text directly or indirectly. The generation unit 13 outputs the generated supplementary information to the output unit 14.

The output unit 14 is a functional element that outputs the supplementary information 24. The supplementary information 24 may be output to any part. For example, the output unit 14 may display the supplementary information 24 on a monitor or print it by a printer, write the supplementary information 24 on a text file, or store the supplementary information 24 in a storage device such as a memory or a database. Alternatively, the output unit 14 may output the supplementary information 24 to an arbitrary computer system different from the information processing system 10 through a communication network. The supplementary information 24 may be transmitted to a terminal of a product provider, transmitted to a terminal of a person different from a product provider (for example, a user of an accommodation reservation site), or transmitted to both of them. In the case of showing the supplementary information to a product provider, the output unit 14 may transmit only the supplementary information related to the facility of the product provider to a terminal of the product provider.

Figure 7:
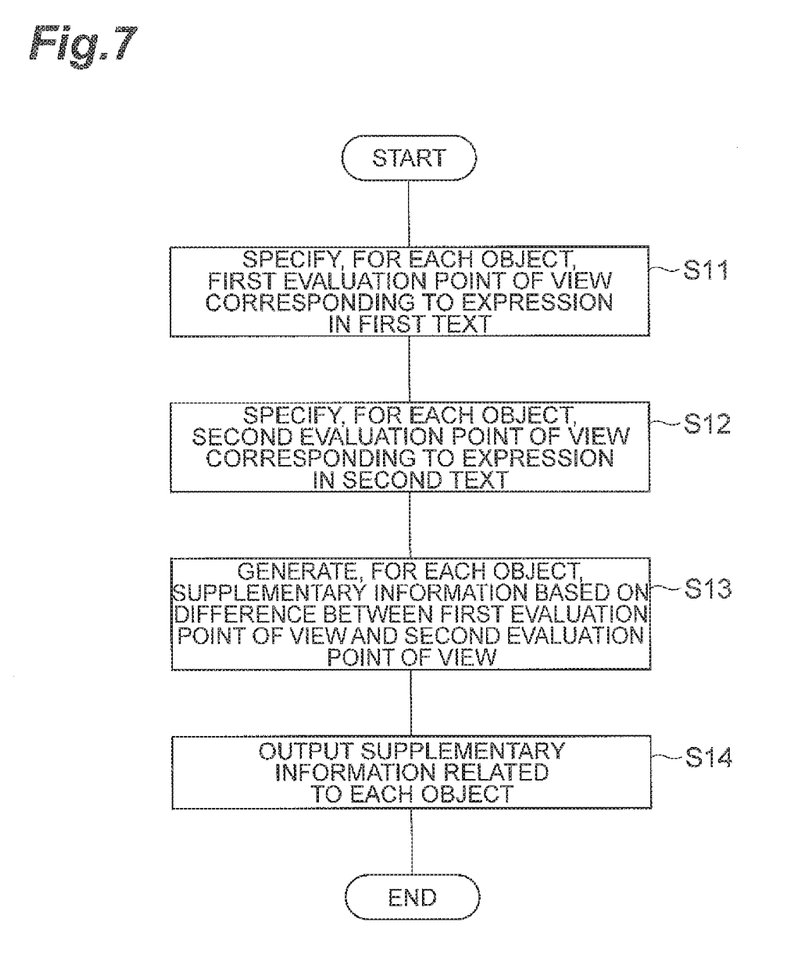
FIG. 7 is a flowchart showing an operation of an information processing system according to an embodiment.

Hereinafter, the operation of the information processing system 10 and an information processing method according to this embodiment are described with reference to FIG. 7.

First, the first specifying unit 11 specifies the first evaluation point of view corresponding to an expression in the first text (for example, a description) (Step S11, first specifying step). This processing is performed for each object (for example, facility) to be processed. To be specific, the first specifying unit 11 divides the first text into a plurality of expressions by using morphological analysis or the like, and compares each of the expressions with the dictionary data in the evaluation view point dictionary 23 and thereby specifies the evaluation point of view corresponding to the expression.

Next, the second specifying unit 12 specifies the second evaluation point of view corresponding to an expression in the second text (for example, a review) (Step S12, second specifying step). This processing is also performed for each object. To be specific, the second specifying unit 12 divides the second text into a plurality of expressions by using morphological analysis or the like, and compares each of the expressions with the dictionary data in the evaluation view point dictionary 23 and thereby specifies the evaluation point of view corresponding to the expression.

Then, the generation unit 13 generates the supplementary information based on a difference between the first evaluation point of view and the second evaluation point of view (Step S13, generation step). This processing is also performed for each object. To be specific, the generation unit 13 extracts the evaluation point of view that is not specified from the first text and specified only from the second text, and calculates the score of this evaluation point of view according to need. Then, the generation unit 13 generates the supplementary information based on the specified evaluation point of view. The generation unit 13 may take the score into consideration when generating the supplementary information, and there are various ways to calculate the score. Further, the content of the supplementary information is also not limited.

Finally, the output unit 14 outputs the supplementary information related to each object (Step S14, output step). As described above, the way of outputting is also not limited.

Figure 8:
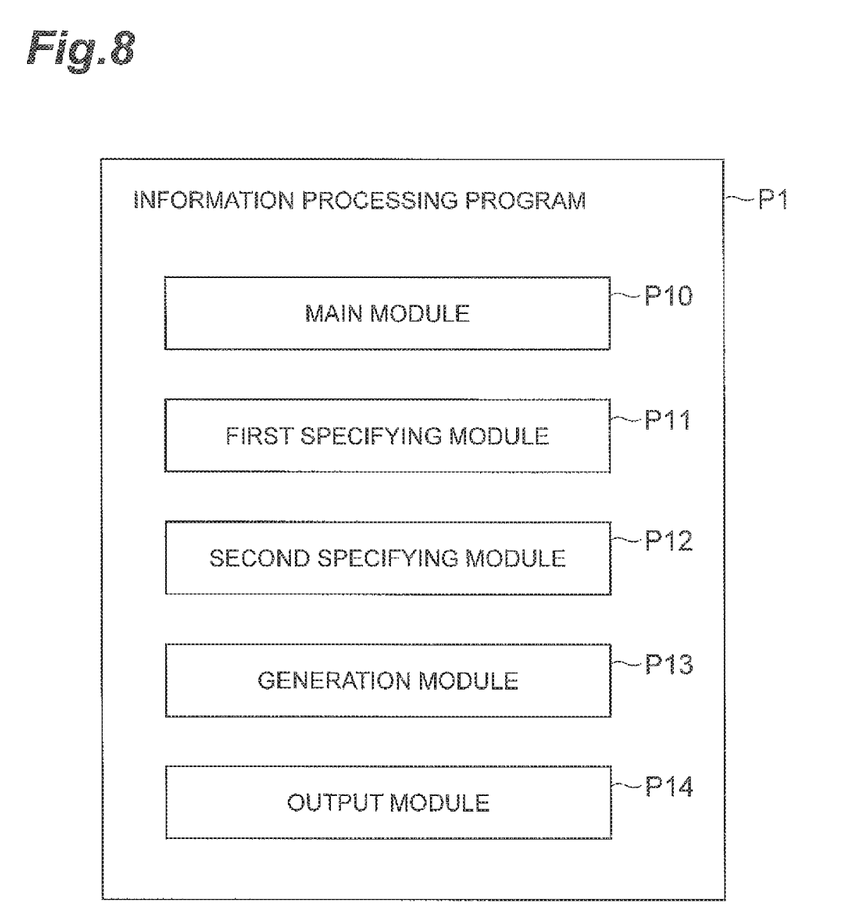
FIG. 8 is a view showing a configuration of an information processing program according to an embodiment.

An information processing program P1 for implementing the information processing system 10 is described hereinafter with reference to FIG. 8.

The information processing program P1 includes a main module P10, a first specifying module P11, a second specifying module P12, a generation module P13, and an output module P14.

The main module P10 is a part that exercises control over the processing related to supplementary information. The functions implemented by executing the first specifying module P11, the second specifying module P12, the generation module P13 and the output module P14 are equal to the functions of the first specifying unit 11, the second specifying unit 12, the generation unit 13 and the output unit 14 described above, respectively.

The information processing program P1 is provided in the form of being recorded in a static manner on a tangible recording medium such as CD-ROM or DVD-ROM or semiconductor memory, for example. Further, the information processing program P1 may be provided as a data signal superimposed onto a carrier wave through a communication network.

As described above, an information processing system according to one aspect of the present invention comprises a first specifying unit configured to specify, based on dictionary data indicating association between an expression and an evaluation point of view, one or more first evaluation points of view corresponding to the expression in first information created by a provider of an object; a second specifying unit configured to specify, based on the dictionary data, one or more second evaluation points of view corresponding to the expression in second information created by a reviewer for the object; a generation unit configured to generate supplementary information based on a difference in an evaluation degree between the first evaluation point of view and the second evaluation point of view; and an output unit configured to output the supplementary information.

An information processing method according to one aspect of the present invention is an information processing method performed by an information processing system including a processor, the method comprising a first specifying step of specifying, based on dictionary data indicating association between an expression and an evaluation point of view, one or more first evaluation points of view corresponding to the expression in first information created by a provider of an object; a second specifying step of specifying, based on the dictionary data, one or more second evaluation points of view corresponding to the expression in second information created by a reviewer for the object; a generation step of generating supplementary information based on a difference in an evaluation degree between the first evaluation point of view and the second evaluation point of view; and an output step of outputting the supplementary information.

An information processing program according to one aspect of the present invention causes a computer to function as a first specifying unit configured to specify, based on dictionary data indicating association between an expression and an evaluation point of view, one or more first evaluation points of view corresponding to the expression in first information created by a provider of an object; a second specifying unit configured to specify, based on the dictionary data, one or more second evaluation points of view corresponding to the expression in second information created by a reviewer for the object; a generation unit configured to generate supplementary information based on a difference in an evaluation degree between the first evaluation point of view and the second evaluation point of view; and an output unit configured to output the supplementary information.

According to the above aspects, evaluation points of view are specified for first and second information respectively written by a provider and a reviewer for the same object, and supplementary information is generated and output based on a difference in the evaluation degree between the respective evaluation points of view. It is thereby possible to extract a difference between the characteristics of an object considered by an information provider and the characteristics of that object considered by users.

As one example, in an EC site that sells a large number of products, a space for describing each product is often limited in order to show many products to users at a time on a search page or the like. Thus, a seller needs to tell the appeal of the product in the limited space. This causes the possibility that the feature of the product written in the description by the seller does not always coincide with the feature considered by users of the EC site (or the feature actually desired by users), and the appeal of the product does not attract users. In the above-described embodiment, such a difference in feeling between a seller and users is specified, and the feature found by the users can be provided to the seller, and the seller can create more appealing description.

In an information processing system according to another aspect, a plurality of expressions may be associated with one evaluation point of view in the dictionary data. By grouping a plurality of expressions together to correspond to one evaluation point of view, it is possible to process the similar expressions at a time. As a result, it is possible to reduce the processing load on the information processing system 10 and show the supplementary information in a way easy to understand.

In an information processing system according to another aspect, the generation unit may calculate a score indicating a characteristic degree of the second evaluation point of view in the object, for the second evaluation point of view extracted based on the difference, and the output unit may output the supplementary information generated based on the second evaluation point of view where the score is equal to or more than a threshold. By using the score, it is possible to output the supplementary information representing the characteristics of the object.

In an information processing system according to another aspect, the generation unit may calculate the score based on a frequency of appearance of the second evaluation point of view. The fact that the frequency of appearance of a certain evaluation point of view is high means that the probability that this evaluation point of view well represents the characteristics of the object is high. Thus, by calculating the score based on the frequency of appearance, it is possible to output the supplementary information representing the characteristics of the object with high accuracy.

In an information processing system according to another aspect, the generation unit may set the score based on a log-likelihood ratio. In this case, because characteristic elements compared with another object are specified as the characteristics of the object, it is possible to output the supplementary information representing the characteristics of the object with high accuracy.

In an information processing system according to another aspect, the output unit may output the supplementary information generated based on the top n number of second evaluation points of view where the score is high. In this case, a certain number of evaluation points of view are selected without depending on the absolute value of the score. It is thereby possible to output substantially the same amount of supplementary information for each object, avoiding the case where the amount of supplementary information for a specific object is too much or too little.

An embodiment of the present invention is described in detail above. However, the present invention is not limited to the above-described embodiment. Various changes and modifications may be made to the present invention without departing from the scope of the invention.

Although an example of the first text is a description of a product in the above-described embodiment, the first text may be a sentence or sentences describing a facility use plan (for example, a hotel stay plan or a golf competition plan etc.) In this case, the information processing system 10 performs the same processing as described in the above embodiment and thereby outputs the evaluation point of view that is not expressed in the description of the use plan (for example, the evaluation point of view can be shown to a manager of the facility).

The information processing system 10 may output the supplementary information containing a specific expression only during a specific period. In this case, the output unit 14 accesses a database that stores records associating expressions and output periods and determines whether the output period of the expression contained in the supplementary information is specified or not. When the supplementary information contains such an expression, the output unit 14 compares the output period with the current time and outputs the supplementary information only when the current time is included in the output period.

For example, it is assumed that the database stores a record in which the evaluation point of view or expression "illumination" and the output period "November, December" are associated. It is also assumed that the supplementary information "Illumination was so great" is generated. In this case, the output unit 14 refers to the record and outputs the supplementary information when it is November or December, and discards the supplementary information without outputting it in other times.

Although the second specifying unit 12 reads reviews corresponding to a facility with no consideration of conditions other than a facility ID in the above-described embodiment, the second specifying unit 12 may read only the reviews by specific users from the second text database 22. To be specific, the second specifying unit 12 reads only the reviews by a user (second creator) who has written about at least k (k>1) number of evaluation points of view in the past. For this purpose, the second specifying unit 12 performs the following pre-processing on each user. Note that, when counting the number of evaluation points of view, the second specifying unit 12 ignores that the same evaluation point of view has been extracted a plurality of times.

The second specifying unit 12 reads a review group corresponding to one user ID to be processed from the second text database 22. The second specifying unit 12 then divides the review into a plurality of expressions by using a known technique such as morphological analysis or semantic analysis, and compares each expression with the dictionary data in the evaluation view point dictionary 23 and thereby specifies the evaluation point of view corresponding to the expression.

Then, the second specifying unit 12 counts the number of evaluation points of view and determine whether the number is equal to or more than a threshold k (k>1). When the number of evaluation points of view is equal to or more than k, the second specifying unit 12 adds the user ID to be processed to a list of users whose reviews are to be collected and proceeds to process the next user. On the other hand, when the number of evaluation points of view is less than k, the second specifying unit 12 proceeds to process the next user without adding the user ID to the list.

After the above-described pre-processing, the second specifying unit 12 generates the second specifying data in the same way as described in the above embodiment by using only the reviews by the users in the list.

For example, it is assumed that the second specifying unit 12 performs processing on the user ID "U2001" shown in FIG. 4. In this case, the second specifying unit 12 reads the review "The location is very convenient, just five minutes by taxi from the train station" for the facility ID "H0001" and the review "It's close to an outlet and very convenient for shopping" for the facility ID "H0003" from the second text database 22.

In this case, when it is assumed that the evaluation view point dictionary 23 stores the dictionary data associating the evaluation point of view "location" and the expressions "station", "taxi" and "outlet", the second specifying unit 12 specifies the evaluation point of view "location" from the reviews for the facility ID "H0001 " based on the dictionary data. Likewise, the second specifying unit 12 specifies the evaluation point of view "location" from the reviews for the facility ID "H0005". Because the second specifying unit 12 ignores the overlap of the evaluation point of view when the same evaluation point of view is specified from a plurality of expressions, the second specifying unit 12 eventually determines that the number of evaluation points of view written in the past by the user ID "U2001" is 1. Because this number is less than the threshold k(k>1), the second specifying unit 12 does not add the user ID "U2001" to the list.

If the expression "outlet" is associated with the evaluation point of view (for example, "surrounding environment" etc.) different from "location" in the evaluation view point dictionary 23, the number of evaluation points of view for the user ID "U2001" is 2. Thus, when the threshold k is 2, the second specifying unit 12 adds the user ID "U2001" to the list.

As described above, in an information processing system according to another aspect, the second specifying unit may select a reviewer who has written about a plurality of second evaluation points of view and specify one or more evaluation points of view from the second information corresponding to the selected reviewer. By suppressing the amount of second information by filtering in this manner, it is possible to reduce the processing load on the information processing system 10. Further, by referring only to the information by the reviewer who tends to make evaluations from a plurality of points of view, it is possible to generate the supplementary information whose content is not biased.

Although the above-described embodiment is based on the assumption that the evaluation degree of the evaluation point of view is 0 or 1, the way to set the evaluation degree is not limited thereto. For example, the first specifying unit or the second specifying unit may set the evaluation degree based on the corresponding number of characters or the number of images, for each evaluation point of view in text. The first specifying unit sets the evaluation degree Ea of the evaluation point of view to 1.0 when the length of a character string related to the evaluation point of view in the text of a certain object is less than 10, sets it to 1.5 when the length of the character string is equal to or more than 10 and less than 30, and sets it to 2.0 when the length of the character string is equal to or more than 30. Further, the second specifying unit sets the evaluation degree in the same manner as the first specifying unit for each text of the object, and sets the average value of the evaluation degrees as the evaluation degree Eb of the evaluation point of view. Then, the generation unit extracts only the evaluation point of view where a difference in the evaluation degree (Eb−Ea) is equal to or more than a threshold (for example, 0.5) and then calculates the score of the extracted evaluation point of view in the same way as described in the above embodiment. The subsequent processing is the same as described in the above embodiment.

REFERENCE SIGNS LIST

10 . . . information processing system, 11 . . . first specifying unit, 12 . . . second specifying unit, 13 . . . generation unit, 14 . . . output unit, 21 . . . first text database, 22 . . . second text database, 23 . . . evaluation view point dictionary, 24 . . . supplementary information, P1 . . . information processing program, P10 . . . main module, P11 . . . first specifying module, P12 . . . second specifying module, P13 . . . generation module, P14 . . . output module

The invention claimed is:

1. An information processing system comprising:
at least one memory configured to store program code; and
at least one processor configured to access said memory, read said program code, and operate according to said program code, said program code including:
first specifying code configured to cause at least one of said at least one processor to:
access, through a communication network, a first storage configured to store first information generated via a terminal of a provider of an object, the first information being displayed on a given page of a web site through which the object is providable by the provider; and
specify, based on dictionary data indicating association between an evaluation point of view, indicating attribute of the object, and an expression including one or more words, representing a characteristic corresponding to the attribute of the object, one or more first evaluation points of view corresponding to the expression in the first information stored in the first storage;
second specifying code configured to cause at least one of said at least one processor to access, through the communication network, a second storage configured store second information generated by terminals of a plurality of reviewers for the object, and specify, based on the dictionary data, one or more second evaluation points of view corresponding to the expression in the second information stored in the second storage;
generation code configured to cause at least one of said at least one processor to extract at least one second evaluation point of view based on a difference in an evaluation degree between the one or more first evaluation points of view and the one or more second evaluation points of view, the difference indicating that the at least one second evaluation point of view is contained in the second information and is not contained in the first information, and obtain a score indicating a characteristic degree of the at least one second evaluation point of view in the object, the characteristic degree indicating how specifically the at least one second evaluation point of view is correlated with the object, among a plurality of objects of which the one or more first evaluation points of view are specified by the first specifying code; and
output code configured to cause at least one of said at least one processor to output, to a given terminal which access the web site through which the object is providable by the provider, supplementary information generated based on the at least one second evaluation point of view where the score is equal to or more than a threshold, so as to cause the given terminal to display, on the given page of the web site, the supplementary information in addition to the first information.

2. The information processing system according to claim 1, wherein
a plurality of expressions are associated with one evaluation point of view in the dictionary data.

3. The information processing system according to claim 1, wherein
the generation code causes at least one of said at least one processor to obtain the score based on a frequency of appearance of the at least one second evaluation point of view.

4. The information processing system according to claim 3, wherein
the generation code causes at least one of said at least one processor to set the score based on a log-likelihood ratio.

5. The information processing system according to claim 1, wherein
the output code causes at least one of said at least one processor to output the supplementary information generated based on top n number of second evaluation points of view where the score is high.

6. The information processing system according to claim 1, wherein
the second specifying code causes at least one of said at least one processor to select a reviewer, among the plurality of reviewers, who has written about a plurality of second evaluation points of view and specify the one or more second evaluation points of view from the second information corresponding to the selected reviewer.

7. An information processing method performed by an information processing system including a processor, the method comprising:
accessing, through a communication network, a first storage configured to store first information generated via a terminal of a provider of an object, the first information being displayed on a given page of a web site through which the object is providable by the provider;
specifying, based on dictionary data indicating association between an evaluation point of view, indicating an attribute of the object, and an expression including one or more words, representing a characteristic corresponding to the attribute of the object, one or more first evaluation points of view corresponding to the expression in the first information stored in the first storage;
accessing, through the communication network, a second storage configured store second information generated by terminals of a plurality of reviewers for the object;
specifying, based on the dictionary data, one or more second evaluation points of view corresponding to the expression in the second information stored in the second storage;
extracting at least one second evaluation point of view based on a difference in an evaluation degree between the one or more first evaluation points of view and the one or more second evaluation points of view, the difference indicating that the at least one second evaluation point of view is contained in the second information and is not contained in the first information, and obtaining a score indicating a characteristic degree of the at least one second evaluation point of view in the object, the characteristic degree indicating how specifically the at least one second evaluation point of view is correlated with the object, among a plurality of objects of which the one or more first evaluation points of view are specified; and outputting, to a given terminal which access the web site through which the object is providable by the provider, supplementary information generated based on the at least one second evaluation point of view where the score is equal to or more than a threshold, so as to cause the given terminal to display, on the given page of the web site, the supplementary information in addition to the first information.

8. A non-transitory computer readable medium storing an information processing program causing a computer to:

access, through a communication network, a first storage configured to store first information generated via a terminal of a provider of an object, the first information being displayed on a given page of a web site through which the object is providable by the provider;

specify, based on dictionary data indicating association between an evaluation point of view, indicating an attribute of the object, and an expression including one or more words, representing a characteristic corresponding to the attribute of the object, one or more first evaluation points of view corresponding to the expression in the first information stored in the first storage;

access, through the communication network, a second storage configured store second information generated by terminals of a plurality of reviewers for the object;

specify, based on the dictionary data, one or more second evaluation points of view corresponding to the expression in the second information stored in the second storage;

extract at least one second evaluation point of view based on a difference in an evaluation degree between the one or more first evaluation points of view and the one or more second evaluation points of view, the difference indicating that the at least one second evaluation point of view is contained in the second information and is not contained in the first information, and obtain a score indicating a characteristic degree of the at least one second evaluation point of view in the object, the characteristic degree indicating how specifically the at least one second evaluation point of view is correlated with the object, among a plurality of objects of which the one or more first evaluation points of view are specified; and output, to a given terminal which access the web site through which the object is providable by the provider, supplementary information generated based on the at least one second evaluation point of view where the score is equal to or more than a threshold, so as to cause the given terminal to display, on the given page of the web site, the supplementary information in addition to the first information.

9. The information processing system according to claim 1, wherein the generation code causes at least one of said at least one processor to obtain the score based on a first frequency of appearance of the at least one second evaluation point of view dependently on the object, and a second frequency of appearance of the at least one second evaluation point of view independently on the object.

10. The information processing system according to claim 1, wherein the generation code causes at least one of said at least one processor to obtain the score by using a log-likelihood ratio of a first probability that the at least one second evaluation point of view appears dependently on the object to a second probability that the at least one second evaluation point of view appears independently of the object.

* * * * *